(12) United States Patent
Haberman

(10) Patent No.: US 12,147,478 B2
(45) Date of Patent: Nov. 19, 2024

(54) SYSTEMS AND METHODS FOR ENHANCED INFORMATION VISUALIZATION

(71) Applicant: Adeia Medical Holdings LLC, San Jose, CA (US)

(72) Inventor: Seth Haberman, New York, NY (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

(21) Appl. No.: 17/895,338

(22) Filed: Aug. 25, 2022

(65) Prior Publication Data

US 2023/0132351 A1    Apr. 27, 2023

Related U.S. Application Data

(63) Continuation of application No. 17/136,406, filed on Dec. 29, 2020, now Pat. No. 11,455,343, which is a continuation of application No. 15/710,760, filed on Sep. 20, 2017, now Pat. No. 11,157,567, which is a continuation of application No. 13/962,527, filed on Aug. 8, 2013, now Pat. No. 9,792,389, which is a continuation of application No. 13/549,909, filed on
(Continued)

(51) Int. Cl.
| | | |
|---|---|---|
| *G06F 16/904* | (2019.01) | |
| *G06F 16/95* | (2019.01) | |
| *G06F 16/951* | (2019.01) | |
| *G06F 16/953* | (2019.01) | |
| *G06Q 30/0241* | (2023.01) | |
| *G06Q 30/0601* | (2023.01) | |

(52) U.S. Cl.
CPC ............ *G06F 16/904* (2019.01); *G06F 16/95* (2019.01); *G06F 16/951* (2019.01); *G06F 16/953* (2019.01); *G06Q 30/0277* (2013.01); *G06Q 30/0601* (2013.01); *G06Q 30/0603* (2013.01); *G06Q 30/0605* (2013.01); *G06Q 30/0623* (2013.01); *G06Q 30/0625* (2013.01); *G06Q 30/0627* (2013.01); *G06Q 30/0629* (2013.01); *G06Q 30/0641* (2013.01)

(58) Field of Classification Search
None
See application file for complete search history.

(56) References Cited

U.S. PATENT DOCUMENTS

| | | |
|---|---|---|
| 715,508 A | 12/1902 | Potter |
| 6,199,071 B1 | 3/2001 | Nielsen |
| (Continued) | | |

FOREIGN PATENT DOCUMENTS

| | | | |
|---|---|---|---|
| JP | 2001109712 A | 4/2001 | |
| JP | 2001109742 A | 4/2001 | |
| (Continued) | | | |

OTHER PUBLICATIONS

Swiatek, J., "Companies face a Wiki world," Knight Ridder Tribune Business News [Washington] Jun. 2, 2006. (Year: 2006).*
(Continued)

*Primary Examiner* — Nicholas D Rosen
(74) *Attorney, Agent, or Firm* — Haley Guiliano LLP

(57) ABSTRACT

In accordance with the present invention, an information management application that provides users with the ability to create and customize matrix displays of information relating to a particular product or service for navigation by other users is provided.

16 Claims, 8 Drawing Sheets

Related U.S. Application Data

Jul. 16, 2012, now Pat. No. 8,510,177, which is a continuation of application No. 11/881,905, filed on Jul. 30, 2007, now Pat. No. 8,224,713.

(60) Provisional application No. 60/834,002, filed on Jul. 28, 2006.

(56) References Cited

U.S. PATENT DOCUMENTS

| | | |
|---|---|---|
| 6,269,343 B1 | 7/2001 | Pallakoff |
| 6,418,432 B1 | 7/2002 | Cohen et al. |
| 7,076,244 B2 | 7/2006 | Lazaridis et al. |
| 7,155,508 B2 | 12/2006 | Sankuratripati et al. |
| 7,299,222 B1 | 11/2007 | Hogan et al. |
| 7,437,358 B2 | 10/2008 | Arrouye et al. |
| 7,590,699 B2 | 9/2009 | Natarajan et al. |
| 7,664,739 B2 | 2/2010 | Farago et al. |
| 7,689,499 B1 | 3/2010 | Duquette |
| 7,720,833 B1 | 5/2010 | Wen et al. |
| 7,827,176 B2 | 11/2010 | Korte et al. |
| 7,877,266 B2 | 1/2011 | Brydon et al. |
| 8,006,197 B1 | 8/2011 | Nevill-Manning et al. |
| 8,201,107 B2 | 6/2012 | Chevalier et al. |
| 8,224,713 B2 | 7/2012 | Haberman |
| 8,510,177 B2 | 8/2013 | Haberman |
| 8,577,889 B2 | 11/2013 | Dahl et al. |
| 8,788,492 B2 | 7/2014 | Lu et al. |
| 9,792,389 B2 | 10/2017 | Haberman |
| 10,289,712 B2 | 5/2019 | Jeh et al. |
| 10,636,058 B2 | 4/2020 | Nair |
| 11,157,567 B2 | 10/2021 | Haberman |
| 11,455,343 B2 * | 9/2022 | Haberman .......... G06Q 30/0605 |
| 2001/0053998 A1 | 12/2001 | Kohda et al. |
| 2002/0029267 A1 | 3/2002 | Sankuratripati et al. |
| 2002/0165856 A1 | 11/2002 | Gilfillan et al. |
| 2003/0026231 A1 | 2/2003 | Lazaridis et al. |
| 2003/0115602 A1 * | 6/2003 | Knee ................. H04N 7/17318 348/E7.071 |
| 2003/0125994 A1 | 7/2003 | Jaehn et al. |
| 2003/0126019 A1 | 7/2003 | Taylor et al. |
| 2003/0225764 A1 * | 12/2003 | Smith .................. G06Q 10/10 707/999.009 |
| 2004/0003351 A1 | 1/2004 | Sommerer et al. |
| 2004/0220902 A1 | 11/2004 | Gates et al. |
| 2005/0027699 A1 | 2/2005 | Awadallah et al. |
| 2005/0044112 A1 | 2/2005 | Yamamoto et al. |
| 2005/0256866 A1 | 11/2005 | Lu et al. |
| 2005/0289109 A1 | 12/2005 | Arrouye et al. |
| 2006/0010117 A1 | 1/2006 | Bonabeau et al. |
| 2006/0064411 A1 | 3/2006 | Gross et al. |
| 2006/0069618 A1 | 3/2006 | Milener et al. |
| 2006/0069672 A1 | 3/2006 | Maloney et al. |
| 2006/0069998 A1 | 3/2006 | Artman et al. |
| 2006/0074919 A1 | 4/2006 | Grover et al. |
| 2006/0092133 A1 * | 5/2006 | Touma ................. G06F 3/04815 345/158 |
| 2006/0101323 A1 * | 5/2006 | Satyavolu ............. G06Q 40/12 705/40 |
| 2006/0117038 A1 | 6/2006 | Toebes et al. |
| 2006/0123448 A1 | 6/2006 | Ma et al. |
| 2006/0167862 A1 | 7/2006 | Reisman |
| 2007/0016585 A1 | 1/2007 | Nickell et al. |
| 2007/0027811 A1 * | 2/2007 | Jackson ................ G06F 16/951 705/52 |
| 2007/0064811 A1 | 3/2007 | Zador et al. |
| 2007/0233692 A1 | 10/2007 | Lisa et al. |
| 2008/0005064 A1 | 1/2008 | Sarukkai |
| 2008/0021874 A1 | 1/2008 | Dahl et al. |
| 2008/0072180 A1 | 3/2008 | Chevalier et al. |
| 2008/0140779 A1 | 6/2008 | Ahn et al. |
| 2021/0117475 A1 | 4/2021 | Haberman |

FOREIGN PATENT DOCUMENTS

| | | |
|---|---|---|
| JP | 2001142972 A | 5/2001 |
| JP | 2002007834 A | 1/2002 |
| JP | 2002358450 A | 12/2002 |
| JP | 2002358454 A | 12/2002 |
| JP | 2005242958 A | 9/2005 |
| JP | 2006107434 A | 4/2006 |
| KR | 20010106880 A | 12/2001 |

OTHER PUBLICATIONS

ANON., "Groople Automates Group Travel Online; Small Groups Are a Big Deal," Business wire, Jul. 7, 2004.

ANON., "IM2, Inc. Secures $8 Million Invesnnent from Redpoint Ventures and Lightspeed Venture Partners," Business Wire, Feb. 17, 2005.

ANON., "O2 Launches Yell.com Directory Service on xda Smart Device with Action Engine's Browserless Mobile Web Services Platform," Business Wire, Jun. 10, 2003, p. 5144.

ANON., "Secret Search Agent," Information Week, Mar. 29, 1999, p. 134.

ANON., "S-JR 16:57 Varner Purchases Licensing Rights to D.A. V.I.D. Browser," Oct. 29, 2001, PR Newswire.

Anon., "Yahoo Adds Sharing to Personalized Search," InternetWeek, Jun. 30, 2005.

* cited by examiner

SYSTEMS AND METHODS FOR ENHANCED INFORMATION VISUALIZATION

CROSS-REFERENCE TO RELATED APPLICATIONS

This application is a continuation of U.S. patent application Ser. No. 17/136,406 filed Dec. 29, 2020, which is a continuation of U.S. patent application Ser. No. 15/710,760 filed Sep. 20, 2017, now U.S. Pat. No. 11,157,567, issued Oct. 26, 2021, which is a continuation of U.S. patent application Ser. No. 13/962,527 filed Aug. 8, 2013, now U.S. Pat. No. 9,792,389, issued Oct. 17, 2017, which is a continuation of U.S. patent application Ser. No. 13/549,909 filed Jul. 16, 2012, now U.S. Pat. No. 8,510,177, issued Aug. 13, 2013, which is a continuation of U.S. patent application Ser. No. 11/881,905 filed Jul. 30, 2007, now U.S. Pat. No. 8,224,713, issued Jul. 17, 2012, which claims the benefit of U.S. Provisional Patent Application No. 60/834,002 filed on Jul. 28, 2006, and the entire contents of each are incorporated herein by reference.

TECHNICAL FIELD

The present invention relates to the field of information visualization, and more particularly towards systems and methods for organizing and displaying information for enhanced navigation.

BACKGROUND

With the advent of the World Wide Web, a vast amount of information has been made available to a large group of users. With the increasing amount of information that is made available to users, this makes it increasingly difficult for users to navigate through all the available information.

To allow users to locate information on the World Wide Web, a number of search engines (e.g., Google, Yahoo, etc.) have been developed and provided. A search engine is a program that searches web pages for specified keywords or search terms and returns a list of web pages where the keywords were found. For example, a user looking for information relating to "consumer reports on Honda Minivans" generally receives a list of hyperlinks to web pages with some or all of those words in them. Search engines will normally look in their entire database of target websites for relevant results, generate a list of hyperlinks to particular web pages, and rank the list in order of relevance. Alternatively, a user can obtain information by directly accessing a particular web page or using a search engine to conduct a search on an individual website.

However, search engines are often less than precise and a user typically needs to peruse and sort through a large amount of information to find the information or portions of the information that the user is looking for. As a result, a user generally misses the desired information that is buried in the search results. This problem is applicable to any collection of information or records.

Accordingly, it is desirable to provide systems and methods that overcome these and other deficiencies of the prior art.

SUMMARY

In accordance with the present invention, systems and methods for providing an information management application are provided.

In some embodiments, the information management application receives information from a user that relates to a product or a service. Alternatively, the information management application may receive a query from the user for information relating to a product or a service. In response, the application transmits the query to multiple information sources (e.g., search engines, informational websites, etc.). The application may then receive the information from the multiple information sources.

In some embodiments, the information management application may compile the information for a particular product or service and display a matrix display that organizes the received information into a plurality of topics and/or categories.

In some embodiments, the information management application may determine whether updated information is available by transmitting a second query to the plurality of information sources. In response to receiving the updated information from one or more of the information sources, the information management application updates the matrix display to include the updated information from at least one of the information sources. The information management application may also display an indicator that notifies the user that updated information has been received.

In some embodiments, the information management application may retrieve metadata or any other suitable tag from the information entered by the user or from the information retrieved by the information management application to determine categories of information (e.g., Prices, Dealerships, Consumer Reports, etc.). Alternatively, the user may input the categories to the information management application.

In some embodiments, the information management application may allow the user to provide access to the matrix display generated for the user. In some embodiments, the application may allow the plurality of users to add and/or edit information in the matrix display.

In some embodiments, the information management application may provide users with one or more purchasing opportunities. The information management application may set up a bulk transaction such that a group of users receive a discount for purchasing a product or a service in bulk. In some embodiments, the information management application may provide the user with a purchasing opportunity that provides the users with leverage to negotiate with the manufacturer, distributor, or seller.

Thus, there has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there is illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

DETAILED DESCRIPTION OF ILLUSTRATIVE EMBODIMENTS

Figure 1:
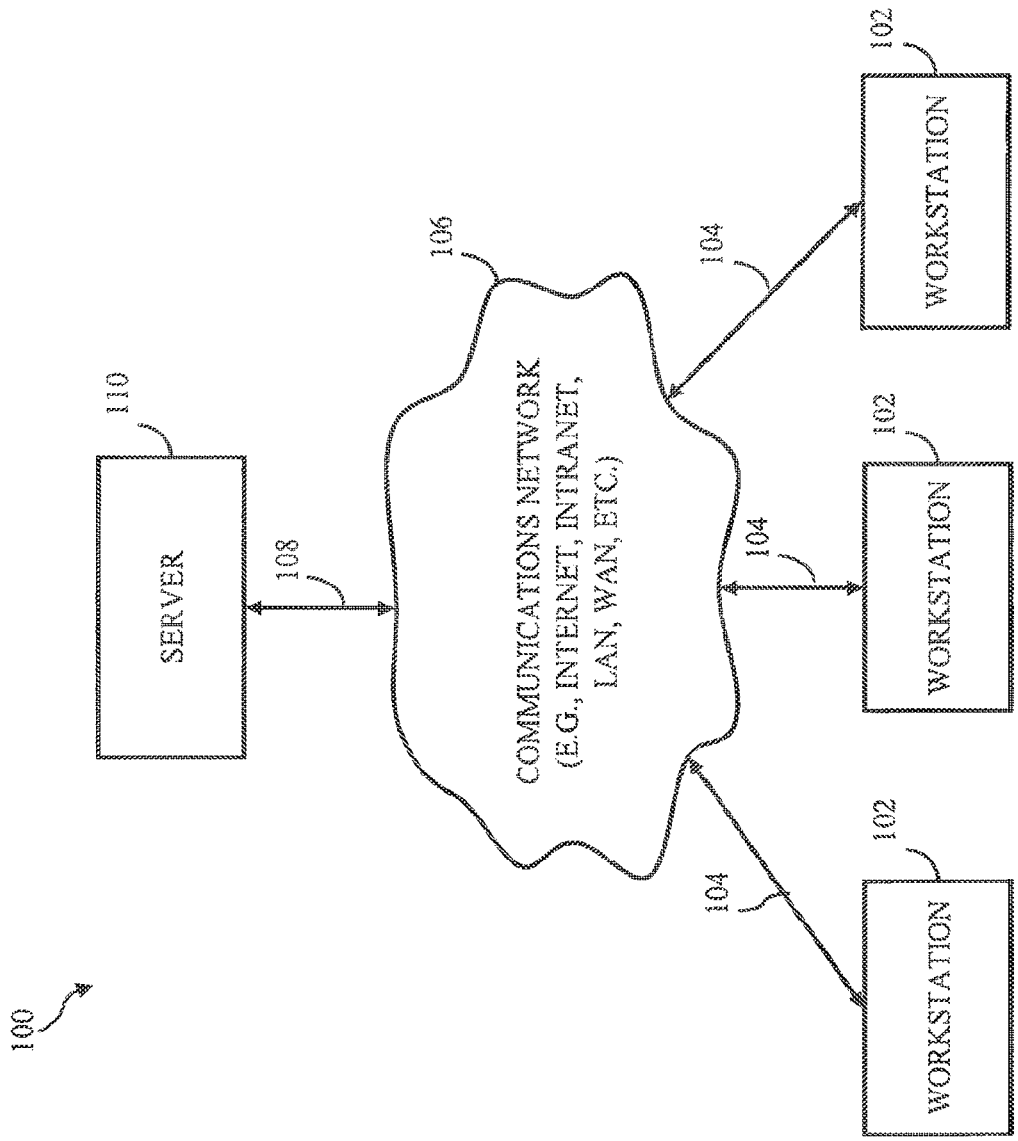
FIG. 1 is a schematic diagram of an illustrative information management system on which an information management application may be implemented in accordance with some embodiments of the present invention.

The following description includes many specific details. The inclusion of such details is for the purpose of illustration only and should not be understood to limit the invention, Moreover, certain features which are well known in the art are not described in detail in order to avoid complication of the subject matter of the present invention. In addition it will be understood that features in one embodiment may be combined with features in other embodiments of the invention.

In accordance with the present invention systems and methods for organizing and displaying information for enhanced navigation are provided (hereinafter "the information management application" or "the application"). In particular, systems and methods that allow users to construct customized displays of information and/or make decisions relating to the displayed information are provided.

Generally speaking, the present invention allows a user to create a customizable matrix display of information. For example, the user may have reviewed information on various web pages and other sources of information to research the purchase of a specific product or service (e.g., an automobile, a vacation, a compact disc player, etc.). In another example, the user may have inputting a query for information relating to a specific product or service. Upon obtaining information from various sources, the user may transmit the obtained information to the information management application. The information management application may use information organizing templates to create a visual display that provides a single source of information to other users. The visual display may include, for example, icons, graphics, and/or other visual representations that, upon selection, access particular information from various sources (e.g., a particular web page). Other users may use the information for the researching their purchasing opportunities. That is, without replicating the same or substantially similar research that the user performed or performing research of his or her own using various sources, one or more of the other users may access the information obtained by the user and navigate through that information to research and/or make a purchasing decision on a particular product or a particular service.

Other users may also edit or add additional information based on their research. For example, another user with a similar purchasing experience may add information that the user obtained. The additional information may include, for example, reviews, hyperlinks, information from other searches, etc.

Other users may also access the visual display to create purchasing options (e.g., purchasing in bulk). For example, a user may access the visual display and indicate that the user is interested in purchasing the specific product (e.g., a particular automobile) in bulk. In response to obtaining a given number of interested users, each user may receive a discount on the specific product. In another example, the manufacturer or distributor of the specific product may only provide the users with the specific product if a given number of users indicate their interest in purchasing the product.

Using this application, the user may generate a visual display of information obtained by the user in researching a specific product or a specific service. In response, other users may use the visual display to research, order, and receive the specific product or the specific service.

The following FIGS. 1-8 and their accompanying descriptions provide detailed examples of the implementation of the systems and methods of the present invention.

FIG. 1 is a generalized schematic diagram of an illustrative information management system 100 on which an information management application may be implemented in accordance with some embodiments of the present invention. As illustrated, system 100 may include one or more workstations 102. Workstations 102 may be local to each other or remote from each other. Workstations 102 are connected by one or more communications links 104 to a communications network 106 that is linked via a communications link 108 to a server 110.

System 100 may include one or more servers 110. Server 110 may be any suitable server for providing access to the information management application, such as a processor, a computer, a data processing device, or a combination of such devices. Communications network 106 may be any suitable computer network including the Internet, an intranet, a wide-area network: ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 104 and 108 may be any communications links suitable for communicating data between workstations 102 and server 110, such as network links, dial-up links, wireless links, hard-wired links, any other suitable communications links, or a combination of such links. Workstations 102 enable a user to access features of the information management application. Workstations 102 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. Workstations 102 and server 110 may be located at any suitable location. In one embodiment, workstations 102 and server 110 may be located within an organization. Alternatively, workstations 102 and server 110 may be distributed between multiple organizations.

Figure 2:
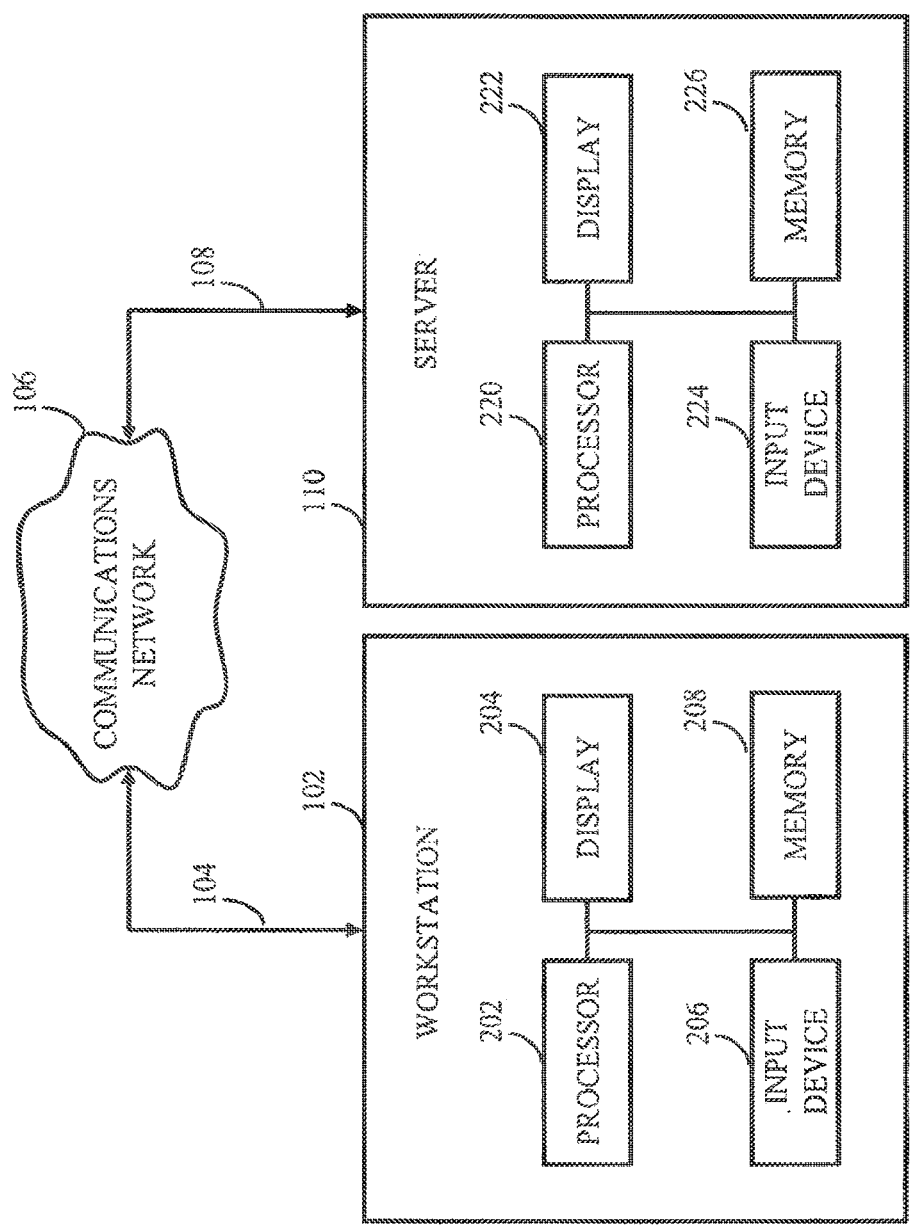
FIG. 2 is a schematic diagram of an illustrative workstation and server as provided, for example, in FIG. 1 in accordance with some embodiments of the present invention.

The server and one of the workstations, which are depicted in FIG. 1, are illustrated in more detail in FIG. 2. Referring to FIG. 2, workstation 102 may include processor 202, display 204, input device 206, and memory 208, which may be interconnected. In a preferred embodiment, memory 208 contains a storage device for storing a workstation program for controlling processor 202.

Processor 202 uses the workstation program to present on display 204 the application and the data received through communications link 104 and commands and values transmitted by a user of workstation 102. It should also be noted that data received through communications link 104 or any other communications links may be received from any suitable source, such as WebServices. Input device 206 may be a computer keyboard, a cursor-controller, dial, switchbank, lever, or any other suitable input device as would be used by a designer of input systems or process control systems.

Server 110 may include processor 220, display 222, input device 224, and memory 226, which may be interconnected. In a preferred embodiment, memory 226 contains a storage device for storing data received through communications link 108 or through other links, and also receives commands and values transmitted by one or more users. The storage device further contains a server program for controlling processor 220.

In some embodiments, the information management application may include an application program interface (not shown), or alternatively, the application may be resident in the memory of workstation 102 or server 110. In another suitable embodiment, the only distribution to workstation 102 may be a graphical user interface ("GUI") which allows a user to interact with the information management application resident at, for example, server 110.

In one particular embodiment, the information management application may include client-side software, hardware; or both. For example; the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the information management application is described herein as being implemented on a workstation and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performling these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet, an Intranet, etc. Either of these may be implemented as a distributed computer system rather than a single computer. Similarly, the communications link may be a dedicated link, a modem over a POTS line, the Internet and/or any other method of communicating between computers and/or users, Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

Figure 3:
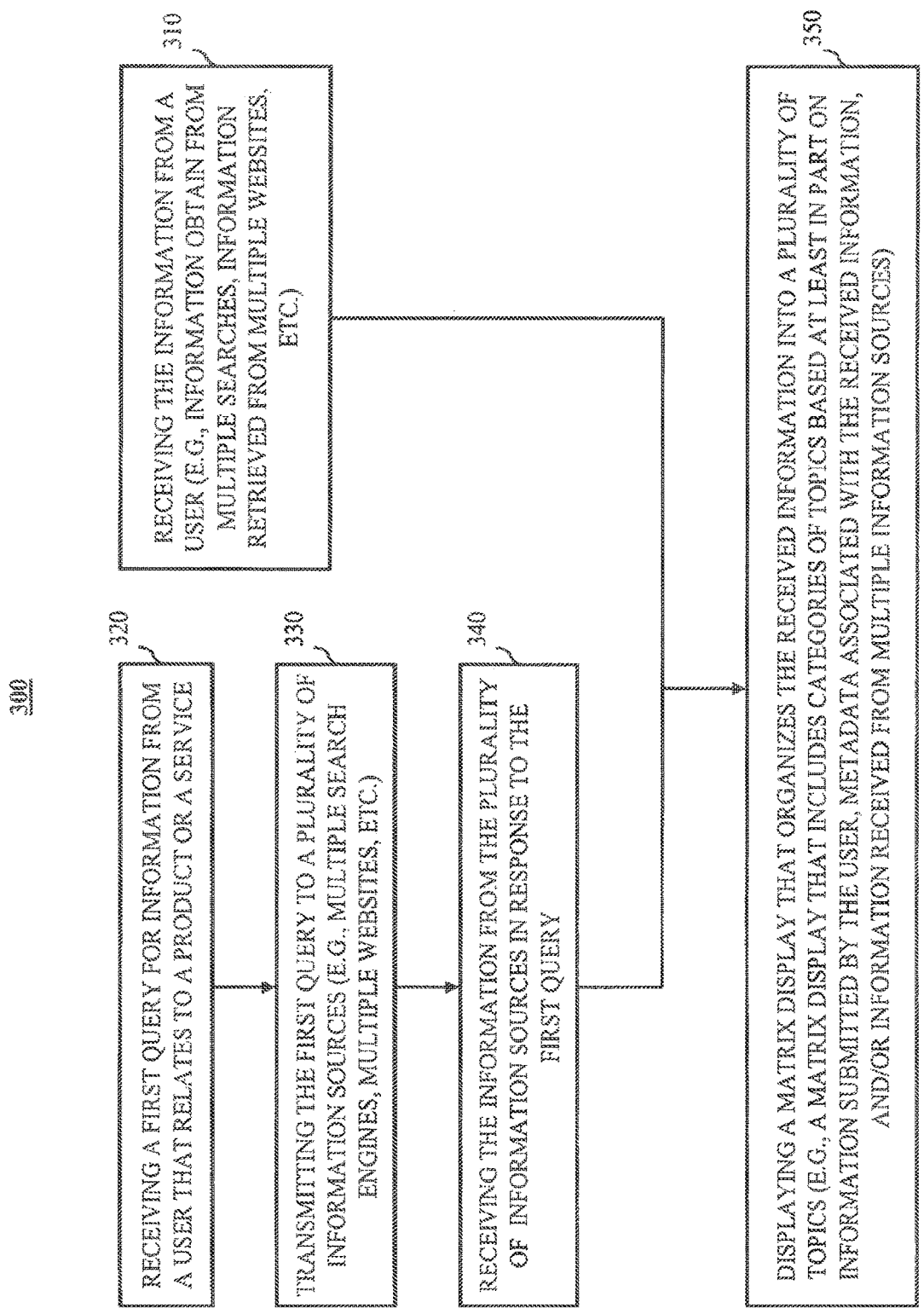
FIGS. 3 and 4 are illustrative flowcharts illustrating the steps performed in generating and displaying a matrix display in accordance with some embodiments of the FIGS. 5-8 are illustrative information displays that may be provided in accordance with some embodiments of the present invention.
Figure 4:
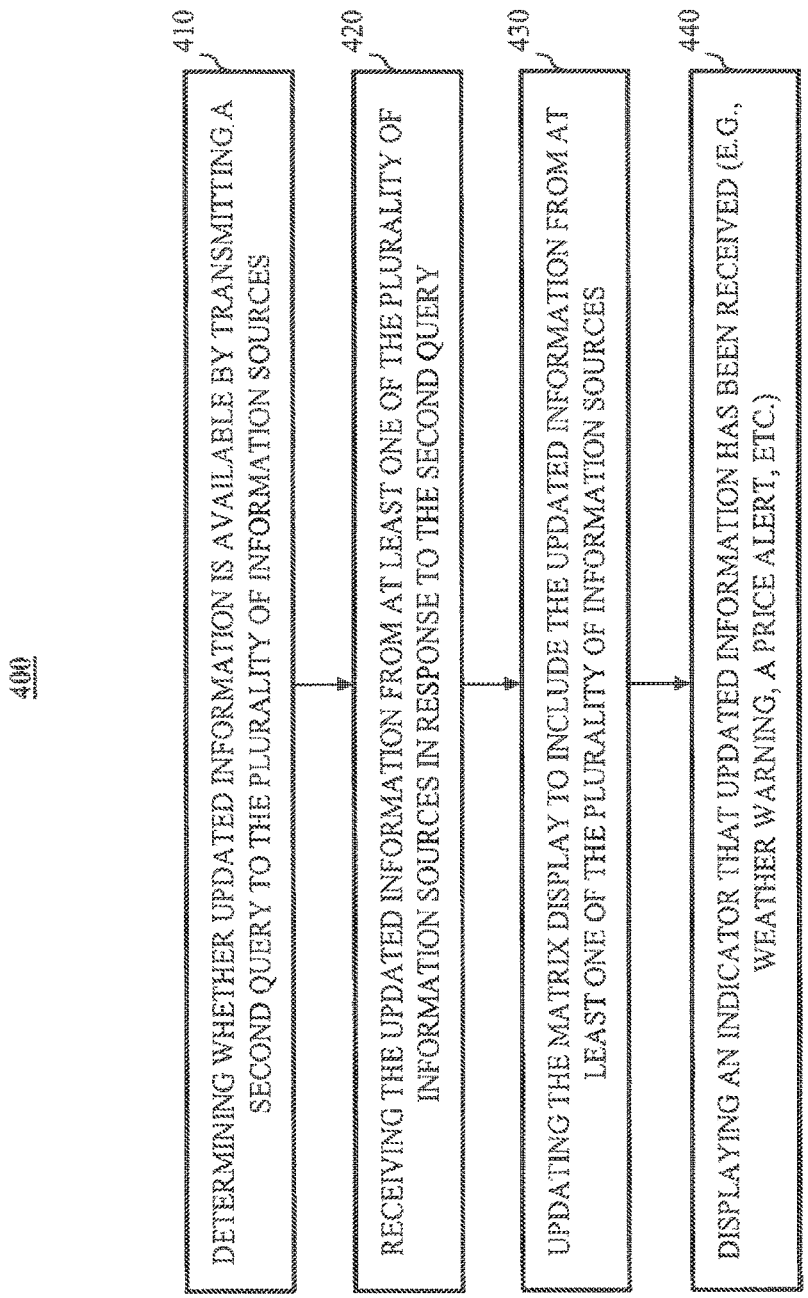

Turning to FIGS. 3 and 4, simplified flowcharts illustrating the steps performed in providing an information management application that displays matrix displays of information in accordance with some embodiments of the present invention are provided. These are generalized flowcharts. It will be understood that the steps shown in FIGS. 3 and 4 may be performed in any suitable order, some steps may be deleted, and others added.

As shown in FIG. 3, the process begins with receiving information from a user that relates to a product or a service (step 310). The information management application may allow the user to input information or links to information relating to a particular product or service. For example, the user may input information relating to specifications, options, prices, consumer reports, models, maintenance, local dealerships, other automobiles the user is interested in, financing options, insurance quotes, etc. Some of the information inputted by the user, such as the price quote received from a particular dealer, may be categorized and placed in, for example, the "Prices" category and/or the "Dealership" category. In another example, the information management application may reformat the information such that it compiles the price quotes received from all users purchasing the same product or service.

Alternatively, the information management application may receive a query from the user for information relating to a product or a service (step 320). For example, the user may input a query for information on the prices of 2007 sedans. In response, the application transmits the query to multiple information sources, such as search engines, informational websites, etc. (step 330). The application may then receive the information from the multiple information sources (step 340).

In some embodiments, the information management application may compile the information obtained from the user for a particular product or service. For example, in addition to information inputted by the user or stored locally in the user's computer (e.g., a local cache), the information management application may determine that the most popular websites that users access to obtain consumer reports are the Edmunds website (www.edmunds.com) and the Car and Driver website (www.caranddriver.com). In response, the information management application may retrieve the information relating to the particular product or service from those websites and display the retrieved information along with the stored or inputted information.

Figure 5:
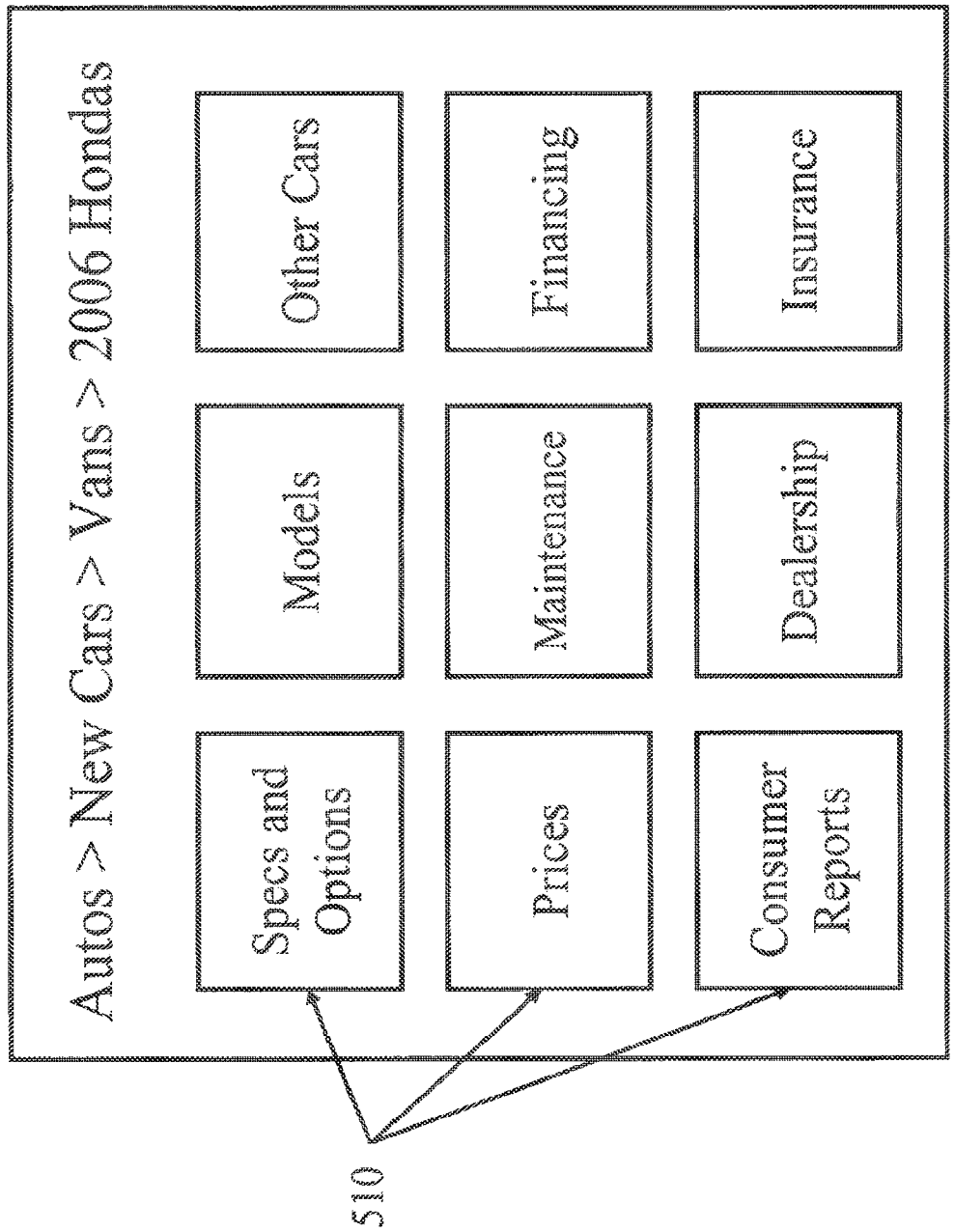

The information management application may use the received information along with one or more templates to generate a matrix display (e.g., display 500 shown in FIG. 5). In some embodiments, the information management application may retrieve metadata or any other suitable tag from the information entered by the user or from the information retrieved by the information management application to determine categories of information (e.g., Prices, Dealerships, Consumer Reports, etc.). Alternatively, the user may input the categories to the information management application. Using the information organizing templates, the information management application generates a customized display of information and/or links to information for other users to navigate (step 350).

As shown in FIG. 4, the information management application may determine whether updated information is available by transmitting a second query to the plurality of information sources (step 410). In some embodiments, the application may retransmit a query to multiple websites (e.g., www.caranddriver.com, www.edmunds.com, etc.) and determine whether updated or changed pricing information is provided. In response to receiving the updated information from one or more of the information sources (step 420), the information management application updates the matrix display to include the updated information from at least one of the information sources (step 430). For example, if www.caranddriver.com informs the application that, due to high demand, the price for the 2007 Honda sedan has gone up $1,000, the application updates the matrix display and notifies the user of the update. The information management application may also display an indicator that notifies the user that updated information has been received (step 440). For example, if the user has a matrix display for particular vacation research, updated information on package discounts, price increases, weather alerts, cancellations, or any other suitable information may be updated at predetermined times (e.g., hourly, daily, weekly, etc.).

Turning now to FIG. 5, an illustrative visual display screen 500 that may be provided in accordance with some embodiments of the present invention is displayed. The information management application is designed to provide users with the ability to efficiently and conveniently create, customize, and/or display information relating to a particular product or service. As shown in FIG. 5, the user may input information relating to a particular product or service and the information management system may generate a visual display that represents the inputted information. The application may also receive the information from multiple information sources and generate a visual matrix display that represents the received information.

It should be noted that screen 500 of FIG. 5 is related to generating a visual display relating to automobiles (e.g., 2006 Honda Vans). However, the information may relate to any other suitable subject, such as, for example, travel, electronics, household goods, or any other suitable product or service.

Screen 500 includes graphical buttons 510 that link the user to information relating to a specific product or service. Graphical buttons 510 may be associated with text, links, photos, vectors, animations, etc.

As shown, screen 500 of FIG. 5 and other screens are designed to be provided on a computer display (e.g., display 204 of workstation 102 or display 222 of server 110 of FIGS. 1 and 2). However, it should be noted that the format and contents of the screens that follow may be modified to accommodate different platforms, if desired. It should also be noted that some, all, or alternatives to the following screens may be provided to a user of the information management application in accordance with the In some embodiments, the information management application may allow the user to input information or links to information relating to a particular product or service. For example, as shown in FIG. 5, the user inputted information relating to specifications, options, prices, consumer reports, models, maintenance, local dealerships, other automobiles the user is interested in, financing options, insurance quotes, etc. Some of the information inputted by the user may be a link to the information. For example, the user may indicate that the consumer reports information that the user prefers is from the Edmunds website (www.edmunds.com). However, another user may create a similar display that uses consumer reports information from Car and Driver website (www.caranddriver.com). Some of the information inputted by the user, such as the price quote received from a particular dealer, may be categorized and placed in, for example, the "Prices" category and/or the "Dealership" category. In another example, the information management application may reformat the information such that it compiles the price quotes received from all users purchasing the same product or service.

In some embodiments, the information on management application may compile the information obtained from users for a particular product or service. For example, the information management application may determine that the most popular websites that users access to obtain consumer reports are the Edmunds website (www.edmunds.com) and the Car and Driver website (www.caranddriver.com). In response, the information management application may retrieve the information relating to the particular product or service from those websites and display the retrieved information in response to a user selecting a "Consumer Reports" button or any other suitable graphical interface.

In some embodiments, the information management application may compile pricing information for a particular product or service. For example, the information management application may determine that users access cnet.com and mysimon.com for pricing information. In response, the information management application may retrieve the best prices so that users using the information management application may compare prices from different pricing information websites.

In response to inputting obtained information from the user or retrieved information from the application, the information management application may use information organizing templates to generate display 500 shown in FIG. 5. For example, the information management application may retrieve metadata or any other suitable tag from the information entered by the user to determine categories of information (e.g., Prices, Dealerships, Consumer Reports, etc.). In another example, the user may input the categories to the information management application. In yet another example, the application may use terms from the query to generate topics and/or categories (e.g., 2006, Honda, sedans, prices, etc.). Using the information organizing templates, the information management application generates a customized display of information and/or links to information for other users to navigate.

As shown in FIG. 5, the information management application may use information organizing templates to create a mosaic or matrix display 500 that includes categories of topics based at least in part on the information inputted by the user, information retrieved from multiple information sources, or the metadata associated with that information. In response to selecting a button or link on the mosaic display 500, the information management application may provide the user with the information relating to the button or link (e.g., by using a web browser application to access information associated with a link).

In some embodiments, the information management application may transmit the information submitted by the user to a web development software package (e.g., Microsoft Frontpage, Macromedia Dreamweaver, etc.). The web development software package may receive the information submitted by the user and instructions from the information management application to generate a web page that includes the information submitted by the user.

Figure 6:
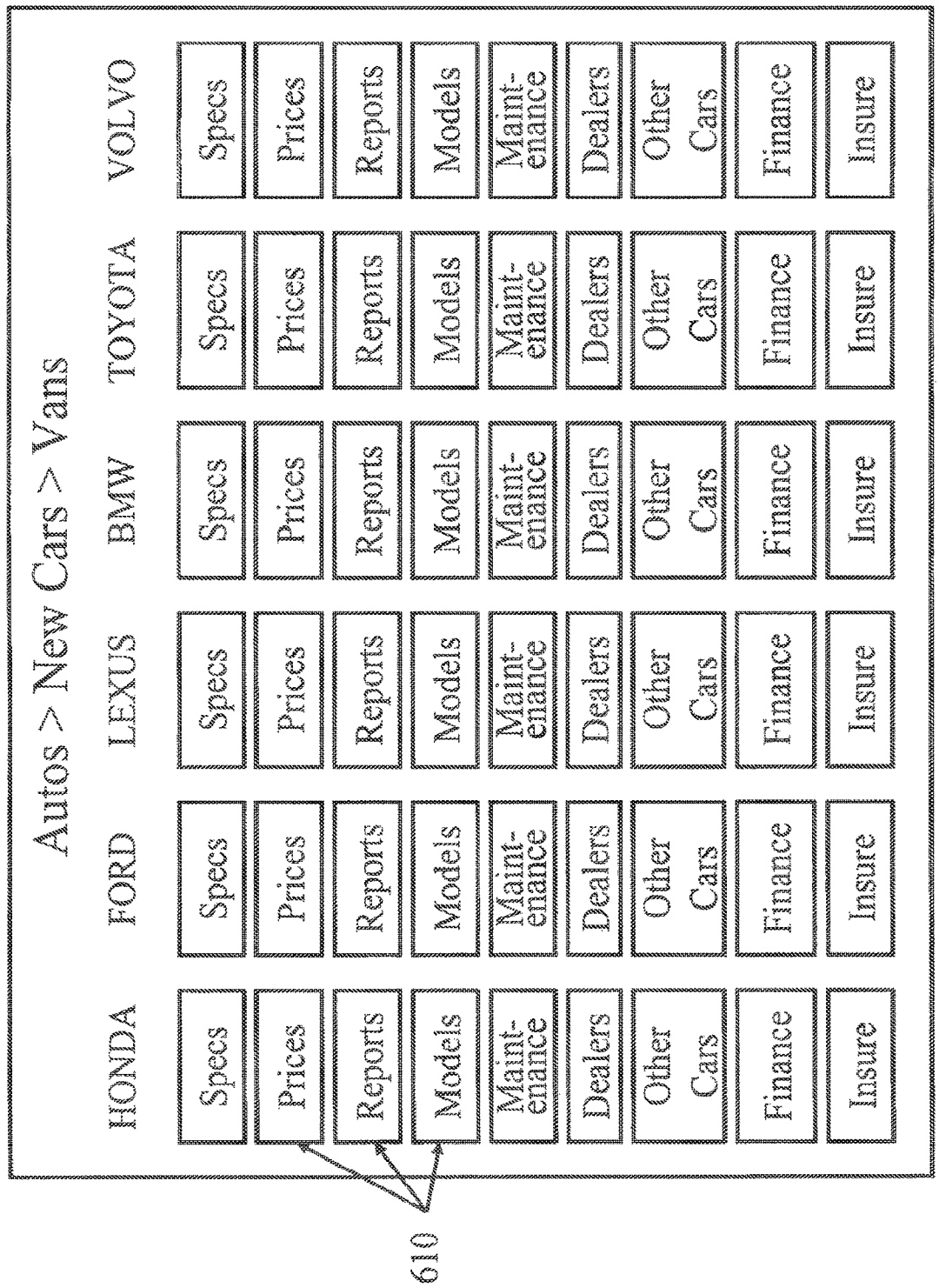

As shown in FIG. 6, screen 600 provides the user with a display of information and links to information for information relating to Vans. Using screen 600 or any other suitable interface, the information management application provides the user with access to information obtained from other users. The user may use the information to make decisions (e.g., purchasing decisions) relating to the specific product or service.

It should be noted that the information and/buttons may include, for example, graphics (e.g., text, images, background filler, visual objects, visual effects, etc.), video segments, audio segments (e.g., synthesized speech, music, background sounds, etc.), animations, etc.

In some embodiments, the user may be required to log in to access the displays of information and links to information (e.g., screens 500, 600, 700, and 800). The user that created the display may invite particular users to access the displays. Alternatively, the user that created the display may allow all users to access the displays. In some embodiments, the user attempting to access the displays may be required to join a group (e.g., indicating interest in a particular product or service).

In response to logging in or joining a group, each user may be provided with restrictive access. For example, some users (e.g., users provided with permission from the user that created the display) may edit or modify the display and/or the information associated with the display, In another example, some users (e,g, users not provided with permission from the user that created the display) may only be allowed to view the display and its associated information and links to information.

Figure 7:
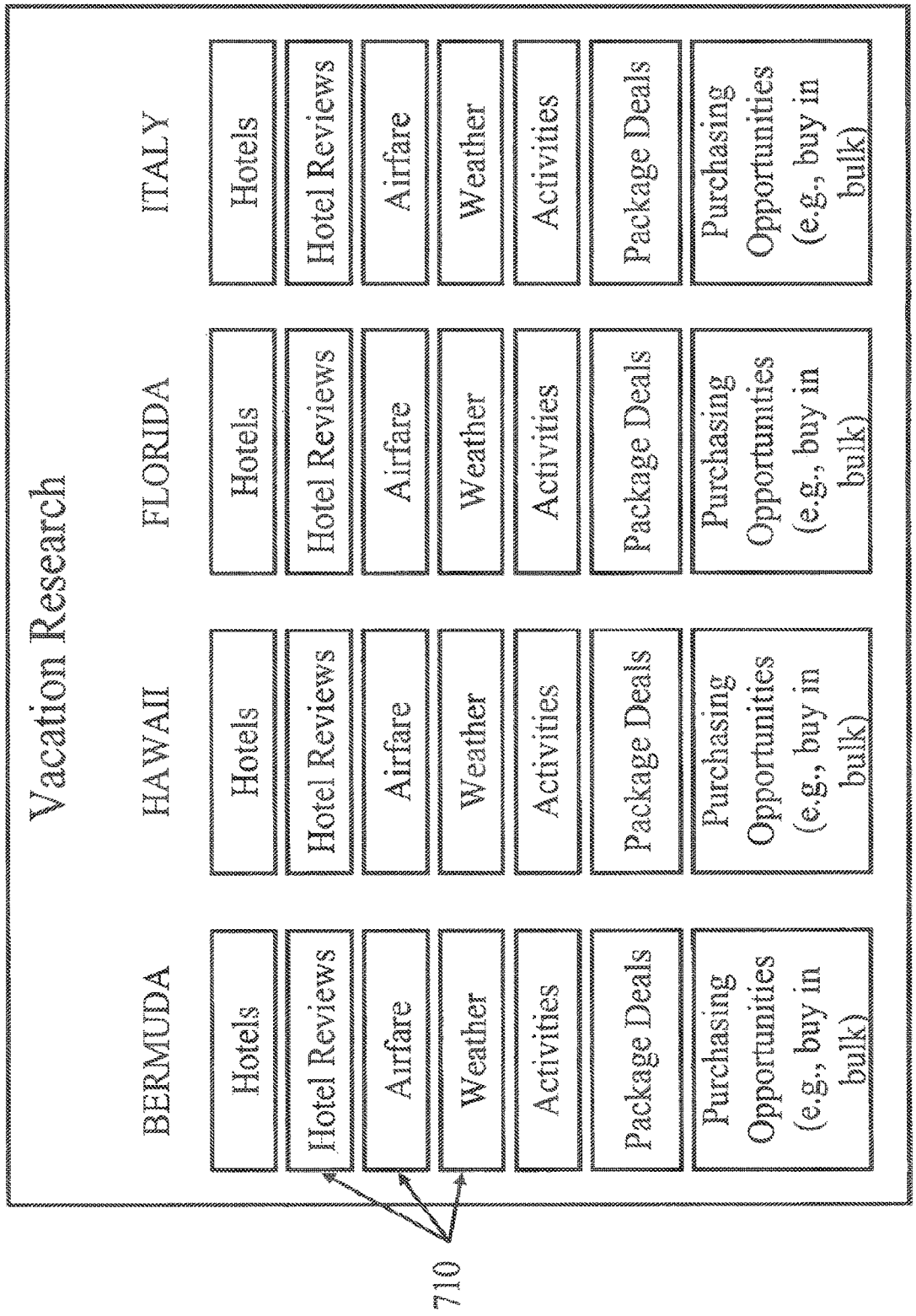

As shown in FIG. 7, in response to the user indicating a desire to access another user's vacation research, the information management application provides the user with an illustrative information screen 700, Illustrative information screen 700 provides the user with a graphical display of links. For example, in response to the user selecting the "Hotels" button, the information management application may provide the user with links to particular hotels that other users' recommend. In response to selecting a link to a particular hotel, the information management application may access the website corresponding to the selected link or execute a web browser application that accesses the website. In another example, the information management application may provide the user with other users' reviews and recommendations that have been entered. Each link may be displayed as a combination of a still picture (e.g., dipped from the linked website) and the title of the category (e.g., hotel).

Figure 8:
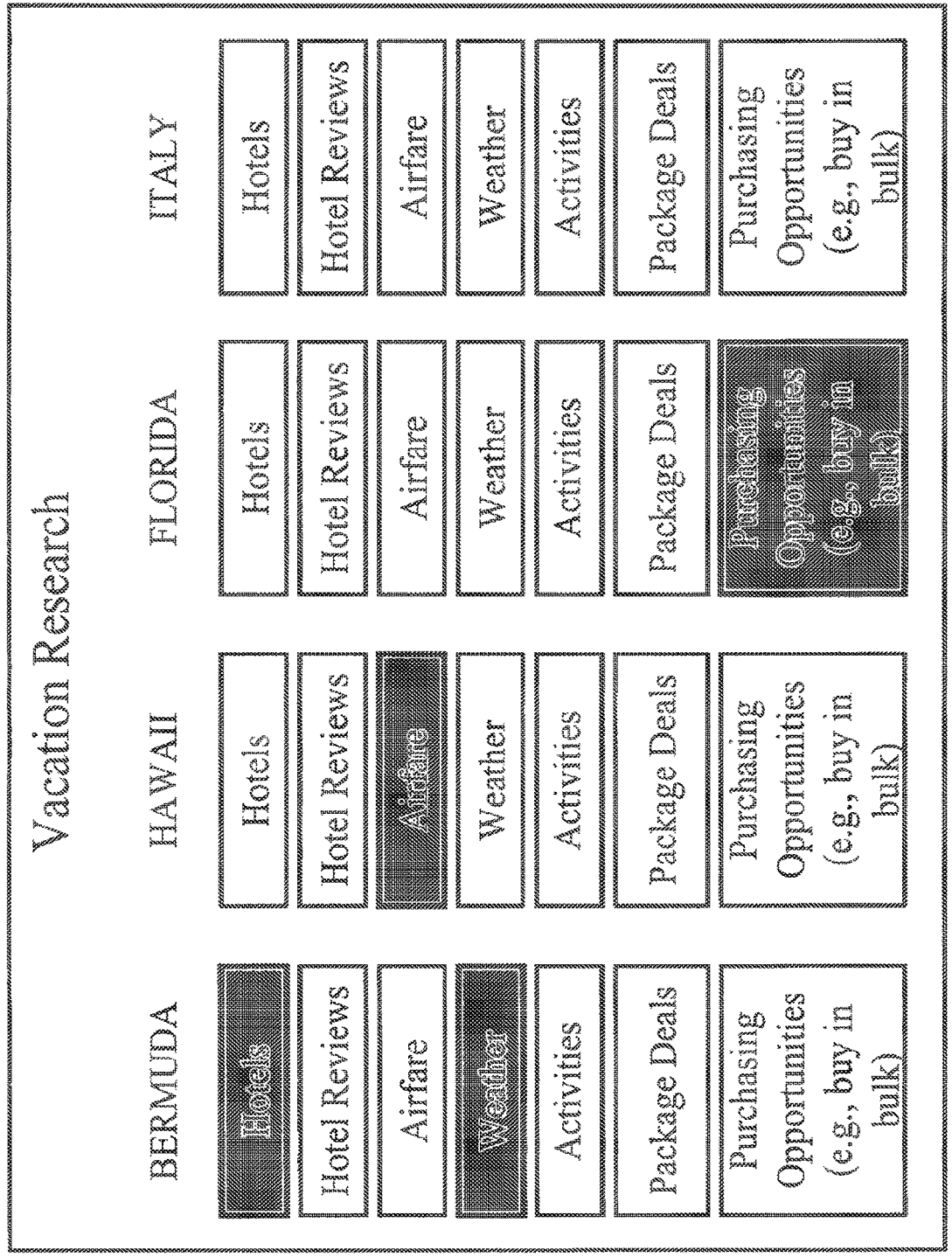

As shown in FIGS. 7 and 8, the application may provide users with one or more purchasing opportunities. In response to one or more users logging in to access the display, joining a particular group to access the display, or performing any other suitable approach, the information management application may provide the users with a purchasing opportunity. For example, the information management application may set up a bulk transaction such that a group of users receive a discount for purchasing a product or a service in bulk. Each user of the bulk transaction may receive a discount, for example, because shipping costs are reduced when purchased in bulk, because the manufacturer, distributor, or seller of the product or service may only sell the product or service when purchased in bulk, etc.

In some embodiments, the application may generate a matrix display for a particular product or service (e.g., a Hawaii vacation) in response to a user obtaining or inputting information retrieved from various websites. The matrix display may provide the user with price quotes and/or purchasing opportunities from one or more merchants for the particular product or service. The application may provide the matrix display to other users. For example, a publicly accessible website may allow other users to search for information on a particular product or service, such as the Hawaii vacation. In response, the publicly available website may display the previously generated matrix display. The application may also receive an indication from at least one of the other users that the user is interesting in the same purchasing opportunity (e.g., purchasing a Hawaii vacation package from a particular merchant). The application may determine which of the users are interested in such a purchasing opportunity and transmit the information to the merchant. In response, the merchant may provide the interested users with a bulk discount. The application may provide the interested users with a bulk purchasing opportunity with the bulk discount.

In some embodiments, the information management application may provide the user with a purchasing opportunity that provides the users with leverage to negotiate with the manufacturer, distributor, or seller. For example, the displays shown in FIGS. 5 and 6 may relate to purchasing health insurance. In response to a user using the displays to review information on the display or information from the links on the display, the user may indicate an interest to purchasing a particular package of health insurance. In response to multiple users indicating the same interest, the information management application may aggregate the information from the multiple users to obtain an improved package of health insurance for the group of users. For example, the information management application may transmit the information to the healthcare provider or service provider (e.g., number of users, age of each user, health of each user, life expectancy of each user, etc.). In response, the healthcare provider or service provider may provide the information management application with a modified health insurance package. For example, for the group of users, the premiums may be reduced, the prescription drug benefits may be expanded, the number of in-network doctors may be expanded, etc. The group of users may then accept or reject the modified health insurance package proposed by the healthcare provider or service provider. Accordingly, this allows users with similar purchasing interests to aggregate their resources to obtain leverage and negotiate an improved arrangement and transaction, In some embodiments, the buttons or links of FIGS. 5-8 may indicate a particular activity to the user. As shown in FIG. 8, the buttons and/or links may be highlighted to indicate a recent change or a warning. For example, the "Weather" link is highlighted to show that a weather advisory or warning has been issued in the area and such an advisory or warning may alter the vacation plans of the user, In another example, the "Airfare" link is highlighted in the "Hawaii" column to show that discounted flights to Hawaii are available. In yet another example, the "Purchasing Opportunities" link is highlighted to show that users may join in on a purchasing opportunity (e.g., purchasing a vacation package in bulk with other users).

In some embodiments, the information management application may be used to create collaborative matrix displays that allow a community of users to add, edit, and/or remove content with the use of metadata.

In some embodiments, the information management application may be used to inform another application for constructing commercials and/or advertisements. For example, the information management application may determine trends, demographic information, and/or other metadata used in generating particular matrix displays. Semantic criteria and/or metadata characteristics from the matrix displays may be transmitted to an editing/assembly software package or a user of the editing/assembly software package. The editing/assembly software package may be used to retrieve media segments relating to the semantic criteria and/or metadata characteristics and assemble one or more versions of the media content. Editing/assembly software packages and features for creating personalized messages based on user information are described in, for example, commonly-owned, commonly-assigned U.S. patent application Ser. No. 09/545,524, filed Apr. 7, 2000, which is hereby incorporated by reference herein in its entirety. Editing/assembly software packages and features for creating personalized messages using semantic criteria and/or metadata characteristics is also described in, for example, commonly-owned, commonly-assigned U.S. patent application Ser. No. 11/449,299, filed Jun. 8, 2007, which is hereby incorporated by reference herein in its entirety.

Accordingly, the information management application provides users with the ability to create and customize displays of information relating to a particular product or service for navigation by other users. As a result, the information management application allows other users to view these customized displays to review the information compiled by a particular user or users. Users may modify the customized displays to add other information. In response to reviewing the information in the customized displays, the information management application allows users to join in a purchasing opportunity.

As described hereinabove, the information management application of the present invention may allow users to generate, customize, and/or distribute information displays. One of ordinary skill would know how to utilize standard algorithms to implement the processes of the present invention based on the information provided in this application.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A method comprising:
   receiving a first query;
   in response to receiving the first query, generating a matrix display of responses to the first query from a plurality of information sources;
   providing access to the matrix display to a plurality of user devices; and
   updating the matrix display based on updated information received from the plurality of information sources based on inputs comprising additions and removals of information from one or more user devices of the plurality of user devices in response to a second query.

2. The method of claim 1, wherein the first query is for information relating to at least one of a product or a service.

3. The method of claim 1, wherein the generating the matrix display of responses further comprises:
transmitting the first query to a plurality of information sources;
receiving the information from the plurality of information sources in response to the first query; and
parsing the information into a plurality of topics, each of the topics representing a category associated with the information.

4. The method of claim 1, further comprising:
determining whether updated information is available.

5. The method of claim 1, further comprising:
displaying an indicator that updated information has been received.

6. The method of claim 1, further comprising receiving a purchasing decision from at least one of the plurality of user devices that has accessed the matrix display.

7. The method of claim 1, further comprising:
receiving at least one preference from at least one of the plurality of user devices;
reformatting the matrix display in accordance with the received preference; and
storing a version of the matrix display.

8. The method of claim 1, further comprising:
receiving log in information from a first user device of the plurality of user devices; and
in response to receiving the log in information, providing access to the matrix display to the first user device.

9. A system comprising:
control circuitry configured to:
receive a first query;
in response to receiving the first query, generate a matrix display of responses to the first query from a plurality of information sources;
provide access to the matrix display to a plurality of user devices; and
update the matrix display based on updated information received from the plurality of information sources based on inputs comprising additions and removals of information from one or more user devices of the plurality of user devices in response to a second query.

10. The system of claim 9, wherein the first query is for information relating to at least one of a product or a service.

11. The system of claim 9, wherein the control circuitry, when generating the matrix display of responses, is further configured to:
transmit the first query to a plurality of information sources;
receive the information from the plurality of information sources in response to the first query; and
parse the information into a plurality of topics, each of the topics representing a category associated with the information.

12. The system of claim 9, wherein the control circuitry is further configured to determine whether updated information is available.

13. The system of claim 9, wherein the control circuitry is further configured to display an indicator that updated information has been received.

14. The system of claim 9, wherein the control circuitry is further configured to receive a purchasing decision from at least one of the plurality of user devices that has accessed the matrix display.

15. The system of claim 9, wherein the control circuitry is further configured to:
receive at least one preference from at least one of the plurality of user devices;
reformat the matrix display in accordance with the received preference; and
store a version of the matrix display.

16. The system of claim 9, wherein the control circuitry is further configured to:
receive log in information from a first user device of the plurality of user devices; and
in response to receiving the log in information, provide access to the matrix display to the first user device.

* * * * *

UNITED STATES PATENT AND TRADEMARK OFFICE
CERTIFICATE OF CORRECTION

| | | Page 1 of 1 |
|---|---|---|
| PATENT NO. | : 12,147,478 B2 | |
| APPLICATION NO. | : 17/895338 | |
| DATED | : November 19, 2024 | |
| INVENTOR(S) | : Seth Haberman | |

It is certified that error appears in the above-identified patent and that said Letters Patent is hereby corrected as shown below:

On the Title Page

The Applicant (Item (71)): "Adeia Medical Holdings LLC, San Jose, CA (US)" should be changed to --Adeia Media Holdings LLC, San Jose, CA (US)--

Signed and Sealed this
Twenty-ninth Day of April, 2025

Coke Morgan Stewart
*Acting Director of the United States Patent and Trademark Office*